United States Patent [19]

Cerkanowicz

[11] Patent Number: 4,605,485

[45] Date of Patent: Aug. 12, 1986

[54] CHARGE INJECTION DEVICE

[75] Inventor: Anthony E. Cerkanowicz, Livingston, N.J.

[73] Assignee: Exxon Research and Engineering Co., Florham Park, N.J.

[21] Appl. No.: 601,253

[22] Filed: Apr. 17, 1984

[51] Int. Cl.⁴ ............................................. B03C 5/00
[52] U.S. Cl. .................................................. 204/302
[58] Field of Search ................................ 204/302, 308

[56] References Cited

U.S. PATENT DOCUMENTS 3,928,158  12/1975  Fritsche et al. ..................... 204/302

Primary Examiner—Howard S. Williams
Attorney, Agent, or Firm—Jay Simon

[57] ABSTRACT

A charge injection device is disclosed which issues free charge injected fluid from an orifice (4) into a region of lower pressure downstream. To avoid significant impairment of charge injection level or efficiency by an electrode pair (5, 8) in the region of the orifice (4) due to the reduced downstream pressure, the pressure in the region of orifice (4) is raised, close to the pressure in the charge injection chamber (2), by feeding gas, such as sulfur hexafluoride, to a chamber (18) having an outlet orifice (27) issuing into the lower pressure downstream region.

21 Claims, 3 Drawing Figures

CHARGE INJECTION DEVICE

BACKGROUND OF THE INVENTION

This invention relates to the control of free charge transport in electrostatic charge injectors to low pressure downstream processing regions. Ordinarily, such low downstream pressures can result in substantial reduction of the charge carried by the fluid (usually liquid) to the downstream regions.

DESCRIPTION OF THE PRIOR ART

Electrostatic free charge injectors are known in the art. An example of such an injector is disclosed in U.S. Pat. No. 4,255,777 obtained from Ser. No. 853,499, filed Nov. 21, 1977 and assigned to the present assignees. The injector is designed to electrostatically charge a liquid stream and discharge it into ambient atmosphere, the stream generally breaking up under the influence of the injected free charge to form a spray, but possibly remaining as a continuous stream at low charging levels and/or high liquid stream throughput velocities. There are, however, applications where it is desired to reduce the ambient pressure downstream of the injector. For example, in an electrostatic separation technique to separate water droplets suspended in oil in which firstly free charge is injected into the mixture using a charge injector and then the charged mixture passes as a spray or continuous stream through a gas or vapor space and into a treatment vessel, avoiding contact with the separation vessel walls while passing through the gas or vapor space. In the separation vessel, the charged emulsion flows onto and through a bed of porous collector beads on which water droplets coalesce, subsequently become re-entrained into the oil, and then settle out under gravity, the removal of the water from the oil is facilitated by exposure of the contaminated oil stream issuing from the charge injector to reduced pressure or vacuum conditions. The reduced pressure, however, reduces the charging level and charge transport efficiency achieved with the charge injector.

SUMMARY OF THE INVENTION

The charge injector device according to the present invention has a discharge means, including an orifice, for issuing fluid which has already been injected with free charge. There is a first region of lower pressure downstream of the discharge means. The charge injection device comprises means which raises the pressure in a second region immediately downstream of said orifice to above said downstream pressure. In this way, fluid issuing from the discharge means passes through the second region before entering the first region. Because the pressure in the second region is kept above that in the first region, it has been found that the charge injection level and charge transport efficiency can be maintained, despite the low pressure in the first region.

In one constructional example, the charge injection device comprises a chamber into which the discharge means issues through the orifice which is arranged as an entrance orifice to said chamber for charged fluid. This chamber has an inlet for introducing gas feed to increase the pressure in the chamber and an outlet orifice for issuing the charged fluid into the downstream region. Gas in the chamber will of course also issue through the outlet orifice.

The pressure in the chamber is chosen so that the charge injection level and charge transport efficiency is increased in comparison to that which would have existed in the absence of the increased pressure. The higher the pressure maintained, the greater the improvement in performance although the upper limit on the pressure in the chamber is the pressure upstream of the orifice of the discharge means which must exceed the downstream chamber pressure in order to maintain the flow through the entrance orifice of the chamber. Preferably, the pressure in the chamber is maintained just below the pressure upstream of the orifice of the discharge means. By the time the fluid stream reaches the outlet orifice, a significant portion of the injected free charge which would have been lost from the stream in the absence of this gas maintained at increased pressure will still be contained within or on the surfaces of the liquid stream.

Preferably, the charge injection device further comprises gas supply means, including pressure adjusting means, connected to the gas inlet. In this way, it is possible for the pressure and gas flow rate at the discharge means to be controlled at a value different from the pressure in the downstream region.

Preferably, the entrance orifice is smaller in size than the outlet orifice. Typically, the ratio of the sizes of the entrance and outlet orifices is about 1:3. The entrance orifice and outlet orifice are preferably both circular, but they may be of any geometry. The circular orifices are easy to form during manufacture and tend to avoid deflecting the fluid flow path through them when the charge injection device is in operation. The entrance orifice can have a diameter of about 0.05 cm and the outlet orifice a diameter of about 0.15 cm. Further, the inter-orifice pressure is preferably made independent of the downstream pumping conditions by suitably selecting the exit orifice size to provide for choked gas flow.

Suitably, the construction of the charge injection device is one in which the entrance orifice is formed in a low voltage electrode in one end of the charge injection chamber having a gas inlet port, there being a high voltage electrode disposed in the charge injection chamber having a pointed region in the vicinity of, and in axial alignment with, the entrance orifice so that the two electrodes enable free charge to be injected into the fluid, there being also a ground electrode to provide a complete electrical circuit for the charge.

The invention is concerned with providing an electrostatic charge injection device which produces a spray or charged fluid stream which issues into a low pressure downstream region with levels of charge injection comparable with that obtainable in an ambient pressure downstream region.

The invention can provide a charge injection device which is simple in construction and reliable in operation.

The invention can also provide a charge injection device which avoids or at least mitigates the occurrence of dielectric breakdown during charge transport from the charge injector.

BRIEF DESCRIPTION OF THE DRAWINGS

The foregoing and further features and objects of the invention will become apparent from the following description, taken in conjunction with the drawings and given by way of example, in which.

GENERAL DESCRIPTION

Figure 1:
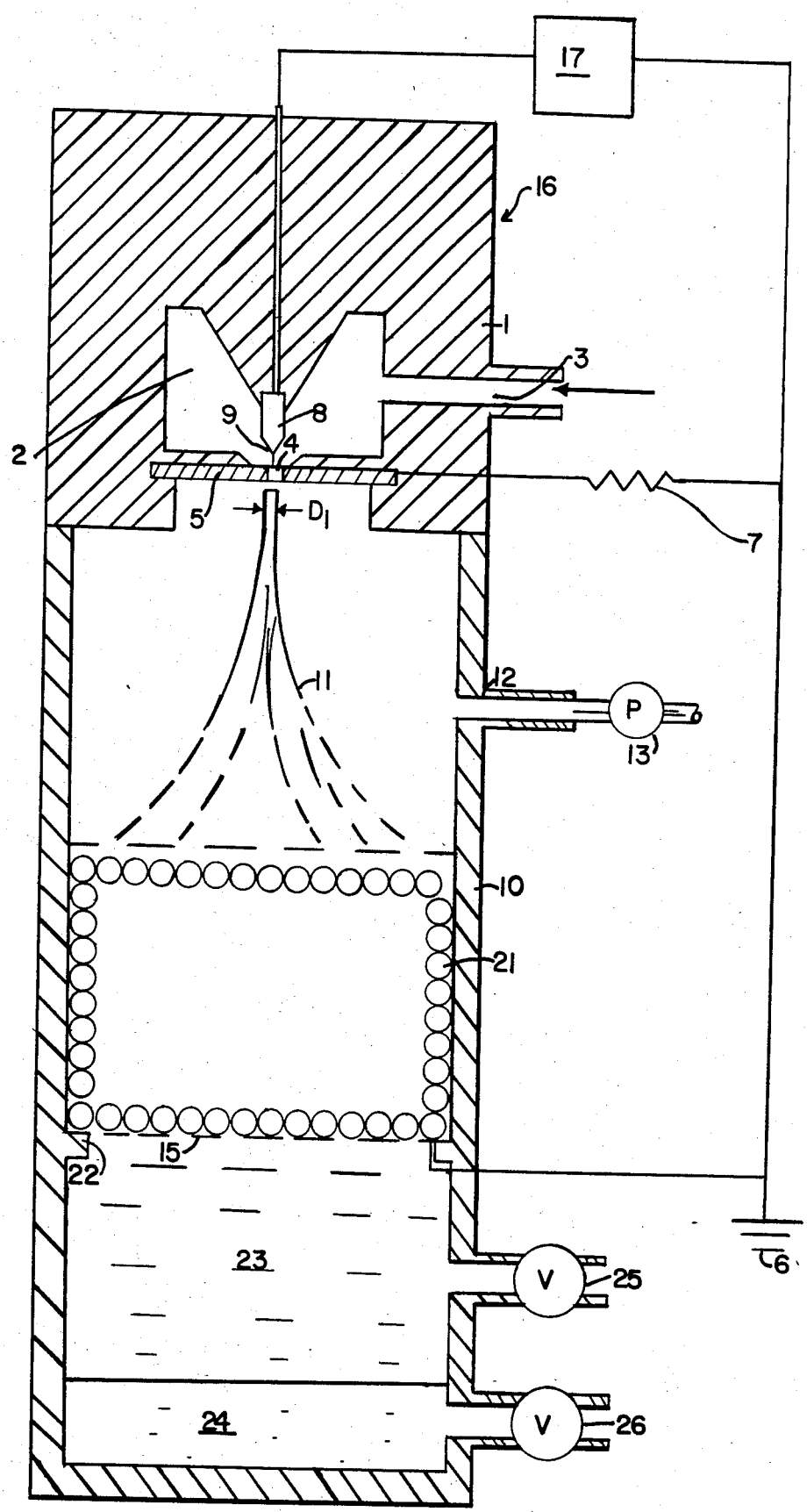
FIG. 1 is a vertical sectional view through one form of charge injector, not forming an embodiment of this invention, mounted at the top of an electrostatic separation apparatus, illustrated digrammatically.

Referring to FIG. 1, there is shown one form of contaminant separation device which comprises, essentially, a upright cylindrical vessel 10 of electrically insulating material, e.g., glass or plastic, housing a bed of densely packed for example glass, plastics or porous beads 21 supported on a conductive gauze 15 in a central region of the vessel 10, the gauze being supported on an internal annular shoulder 22 on the cylindrical wall of the vessel 10. A charge injection device 16 is mounted at the top end of vessel 10.

The charge injector 16 comprises a charge injector body 1 which is secured to the top of the cylindrical vessel 10, the body 1 defining an upright cylindrical chamber 2 having an inlet port 3 fed with fluid (in this example, fine water droplets dispersed in oil) to be clarified or decontaminated and an orifice 4 of small diameter $D_1$ defined by an electrode 5 supported in the body and connected to earth 6 through a resistance 7. A further electrode 8 is also disposed centrally within chamber 2, this electrode being connected to a source 17 of high voltage. This electrode 8 has a pointed or sharp tip 9 which is located closely adjacent to and opposite the outlet orifice 4 and is aligned axially with it. The gauze 15 is grounded at 6 and constitutes the third electrode of the charge injector 16, which completes the electrical circuit for the free charge. A suction point 12 in the wall of vessel 10 is connected to a suction pump system 13, in order to maintain the pressure in vessel 10 downstream of outlet orifice 4 at reduced pressure or under essentially vacuum conditions.

In operation, the liquid or fluid mixture, here a water-in-oil emulsion, to be decontaminated is introduced into chamber 2 through inlet port 3 and issues from the chamber through orifice 4. Due to the operating voltages (typically 2 to 15 kV) applied to electrode pair 5, 8, these electrodes inject free charge into the liquid flowing between these electrodes, and the stream issuing through orifice 4 breaks up and atomizes, under the internal influence of the injected free charge, or otherwise emerges as a continuous charged fluid stream, depending on the applied electrode potential. In either case, the charged fluid is directed, onto the beads 21 and liquid mixture in vessel 10. The injected charge brings about migration of the fine water droplets within the mixture in vessel 10 and the migrating droplets encounter the nearest beads, on whose surfaces they generally agglomerate and coalesce, and thereby build-up droplets of sufficient size which become re-entrained or re-enter into the mixture in the vessel. However, the re-introduced droplets now separate-out, under gravity, on account of their much larger size. The resulting oil and water phases 23, 24 established in the bottom of vessel 10 can be tapped off through respective outlets 25, 26 with release valves. Preferably, the liquid mixture should be maintained just covering the beads and this can be achieved by periodically opening valves 25, 26 manually or controlling their settings automatically, using suitable control equipment.

The application of suction to suction point 12 by pumping system 3 helps to promote the evaporation and removal of water from the contaminated oil through suction point 12. However, as explained above, the resulting reduced pressure inside vessel 10 is observed to cause a reduction in the level and efficiency of charge injection achieved with the charge injector for giving operating voltages. This loss is associated with the pressure dependent electrical characteristics near the charge injector orifice 4 and may be particularly severe in some cases and under certain conditions, such as in instances when the contaminant is water.

Figure 2:
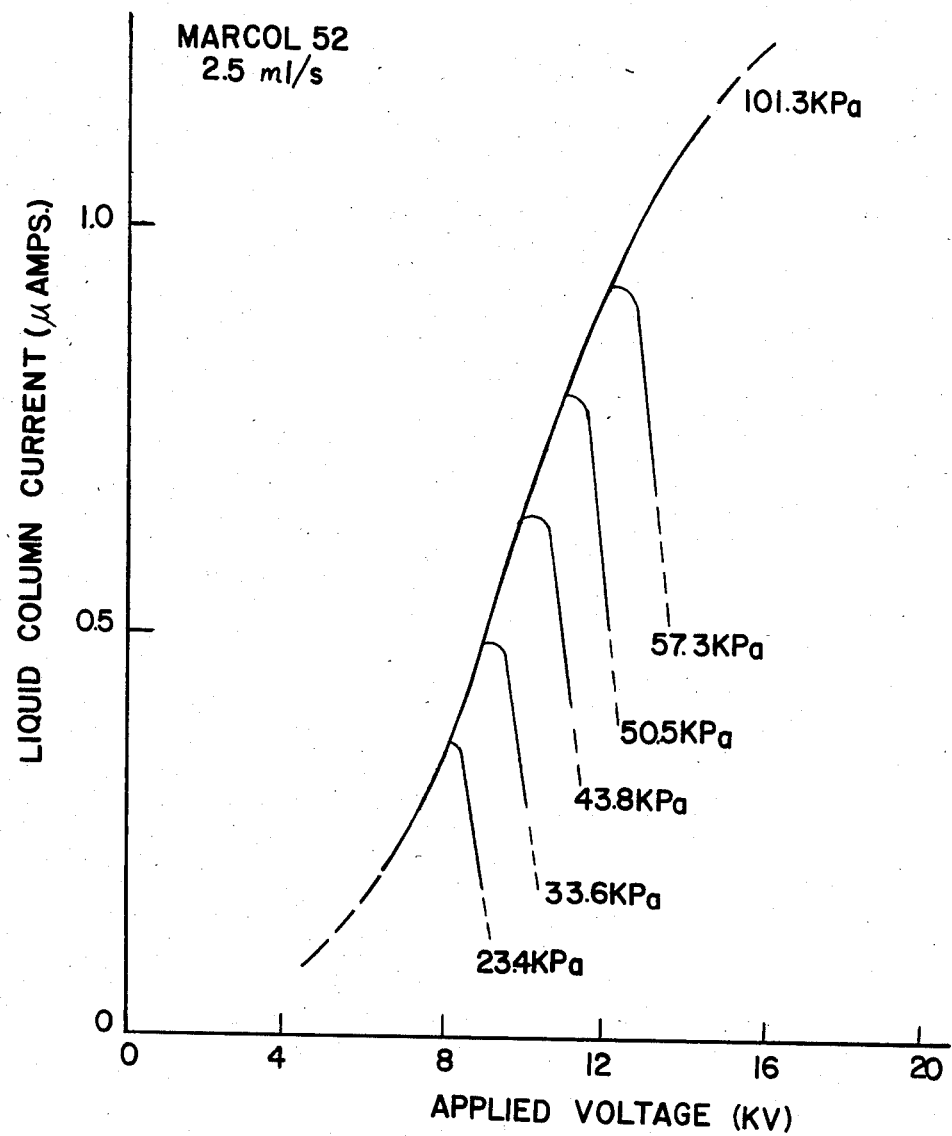
FIG. 2 is a graph illustrating the effect of reduced external gas pressure on the charge level in the liquid stream having been charged in the charge injector.

FIG. 2 illustrates the charge loss incurred when a charged white mineral oil having viscosity of about 11 cps, such as sold under the trade name Marcol 52, (with or without graphite contaminant present) issues from a charge injector into a subatmospheric pressure region, (with no collector beads present), for the different pressure values indicated. Similar behavior is observed for a dewaxed lube oil with viscosity of about 255 cps designated as S600N oil with water contaminant present. However, if the exiting liquid column disrupts into a spray, then the loss becomes more severe as illustrated by the following table for S600N oil with 100 ppm water flowing at 2.5 ml/s into an air background:

| Pressure (kPa) | Spray | Maximum Charge (coul/m³) |
|---|---|---|
| 101.3 | No | ~0.172 |
| 33.6 | No | ~0.072 |
| 33.6 | Yes | ~0.005 |

Figure 3:
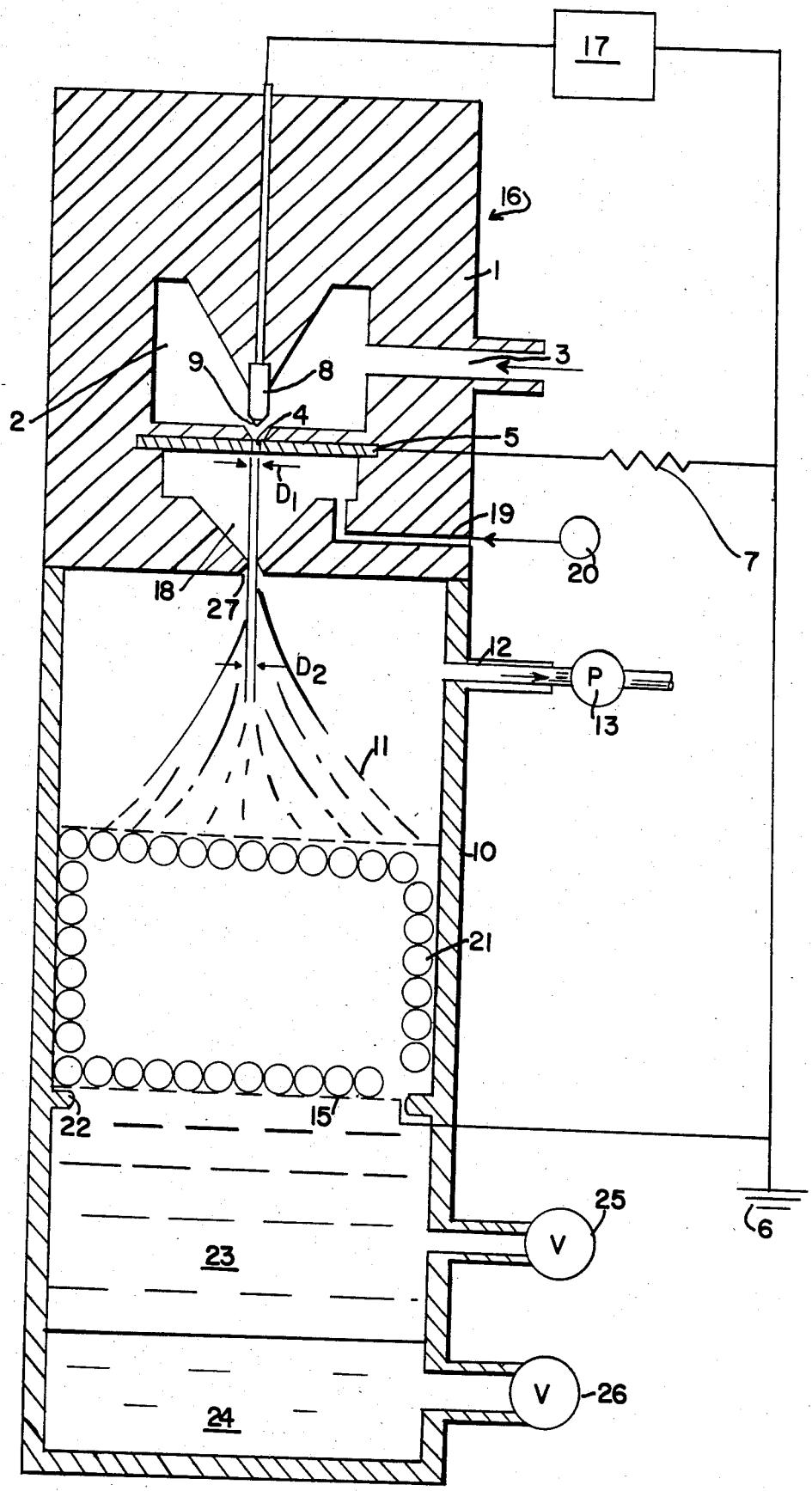
FIG. 3 is a view corresponding to FIG. 1, but illustrating a preferred embodiment of this invention.

Control of charge transport from the injector to downstream low pressure processing regions can be achieved by using the improved charge injector shown in FIG. 3, forming one preferred embodiment of this invention.

Referring to FIG. 3, the illustrated charge injector, which represents a preferred embodiment of the inventorship is constructionally similar in many respects to that described hereinabove with reference to FIG. 1 and where the same reference numerals are used, these denote identical or corresponding parts and they will not be described in any further detail. Additionally, however, it will be seen that the charge injector body 1 in FIG. 3 is extended downwardly from anode electrode 5 to define a second chamber 18, and also an outlet line 19 connected to a source of gas or gas mixture, diagrammatically illustrated at 20. Orifice 4 is arranged as an entrance orifice to chamber 18 for charged liquid. Chamber 18 is provided with an outlet orifice 27 issuing into the low pressure, downstream region of vessel 10. In operation, gas is fed from source 20 through line 19 and into chamber 18 to raise to a pressure value, at most just below that prevailing in charge injection chamber 2, the pressure immediately downstream of entrance orifice 4. The effect of this is found to be that the charge injection level or charge transport efficiency is restored. The charged liquid issuing through orifice 4 then passes, together with introduced gas in chamber 18, out through outlet orifice 27 and into vessel 10 in the form of a spray, for sufficiently high charge levels, or otherwise as a charged stream. The point at which the issuing liquid breaks up into a spray in the former case will depend upon factors such as the applied electrode voltages and the geometry of the charge injector, but in any case is not material to the effective separation of the water from the oil. Operation of the charge injector is essentially identical to that already described in FIG. 1. The water that re-enters the mixture from the beads 21 will separate out as layer 24 beneath the top clarified oily phase 23.

The outlet orifice 27 is preferably larger in size (diameter $D_2$) than the entrance orifice 4 (diameter $D_1$). In a preferred arrangement the diameter ratio is about 3:1. For example, the respective diameters could be about 0.15 cm and about 0.05 cm. The orifices 4, 27 are circular in this construction example, but it is to be understood that other orifice configurations are possible within the scope of this invention as defined by the appended claims. The gas pressure in chamber 18 is controlled by adjustment to the delivery pressure of pumping system 20. The required differential pressure is maintained by the choice of the outlet orifice diameter.

Assuming that the gas flow is choked at the orifice 27 in the annular area between the liquid stream and the orifice perimeter (in which case the pressure in chamber 18 is independent of the pumping conditions in the upper region of vessel 10), then an approximate relationship between the pressure ratio maintained across the orifice and the orifice diameter ratio is given by the following:

$$P_1/P_2 = (K/\sqrt{MW}) \cdot \sqrt{RT A_1} \cdot [(D_2/D_1)^2 - 1]/Q \quad (1)$$

$$K^2 = k\,[2/(k+1)/(k-1)] \quad (2)$$

where:
- k = ratio of specific heats at constant pressure and constant volume of the gas
- MW = molecular weight of gas
- T = temperature of gas
- R = universal gas constant
- $P_1$ = pressure downstream of outlet orifice
- $P_2$ = pressure between orifices
- $A_1$ = area of entrance orifice
- $D_1$ = entrance orifice diameter
- $D_2$ = outlet orifice diameter
- Q = pumping speed of vacuum system For a positive displacement or rotary pump system and negligible conductance loss in the pumping flow path, the pumping speed of the vacuum system will be in dependent of gas type. Only the first term on the right hand side of equation 1 will depend on gas type. The following table shows this dependence for air and $SF_6$.

| GAS | AIR | $SF_6$ |
|---|---|---|
| MW | 28.9 | 146.05 |
| k | 1.4 | 1.094 |
| K | 0.685 | 0.627 |
| $K/\sqrt{MW}$ | 0.127 | 0.0519 |

Use of a gas such as $SF_6$ would also provide for higher pressure ratios ($P_2/P_1$) than possible with air for a given orifice ratio ($D_2/D_1$). Alternatively, for a fixed pressure ratio, a larger orifice diameter ratio would be allowable, thus easing alignment considerations. Sulfur hexafluoride is also a preferred gas for the reason that it reduces or avoids the possiblity of dielectric breakdown downstream of charge injector orifice. Of course, other gases which act to reduce or avoid breakdown which are well-known in the art may be used instead.

It is remarked that the separation technique described in itself does not form part of the present invention and will therefore not be further described, but for a more complete description and understanding of the separation technique using porous beads, reference is hereby directed to the present assignee's co-pending U.S. patent application, Ser. No. 601,276 the contents of which are expressly incorporated herein by reference. Alternatively, instead of porous beads, the beads may be made of non-porous material of low electrical conductivity and high dielectric constant, but that modification is more suitable for use when the contaminant is a solid or gas. In another embodiment, no beads or other collector surfaces exist inside the vessel 10 and such an arrangement is suitable where particulate contaminants are present, the contaminants collecting on the wall surfaces of the vessel 10. In regard to these various embodiments, reference is also directed to the present assignee's co-pending U.S. patent application Ser. Nos. 601,254, 601,271, 601,272, and 601,275, the contents of each of which are expressly incorporated herein by reference.

However, it is further mentioned that the application of the charge injection device is not restricted solely to clarification of contaminated fluids in the manner described. Other applications are electrostatic paint or insecticide spraying for example. Many further applications will be apparent to the man in the art or will become apparent by referring to the aforesaid U.S. Pat. No. 4,255,777, to which the reader is expressly referenced.

Description of the Preferred Embodiments

EXAMPLES

The charge injector design shown in FIG. 3 was implemented for use with a charge injector having an entrance orifice diameter of 0.05 cm. For this experiment, no beads were present in the separation vessel. As configured, the outlet orfice diameter measured 0.15 cm. A vacuum pumping system rated with a pumping speed of 60 liters/min was employed to control the processing region pressure. From equation 1, a pressure ratio ($P_2/P_1$) of about 3 could be established using air as the background gas. A ratio of about 2.3 was achieved in practice. The following table shows the operating characteristics of the dual chamber charge injector design using air as the gas and an injector liquid flow of 2.5 ml/s for S600N oil with 87 ppm water.

| Inter-orifice Pressure (kPa) | Downstream Pressure (kPa) | Spray | Maximum Charge (coul/m$^3$) |
|---|---|---|---|
| 7.3 | 3.1 | No | 0.0036 |
| 101.3 | 101.3 | Yes | 0.16 |
| 93.3 | 43.7 | Yes | 0.12 |

Operation under vacuum conditions in both the inter-orifice and downstream regions resulted in poor charge transport and no spraying, as shown in the first row in the above table. Operation of the system at atmospheric pressure resulted in recovery of significant charge injection as expected, as shown by the data in the second row of the above table. Spraying in this case was caused by the high shear on the liquid column by the air passing through the spray orifice. The data taken at an inter-orifice pressure near atmospheric and a downstream pressure of 43.7 kPa illustrates the benefit of the dual chamber design, as shown in the last row of the above table.

In this case atomization was achieved with a low pressure in the downstream processing region while still maintaining a significantly high charge density level. This particular combination of operating conditions was not possible using the single chamber configuration.

Using $SF_6$ as the gas gave pressure ratios ($P_2/P_1$) as high as 3.8 and allowed the achievement of a maximum charge level of 0.4 coul/m$^3$ at a downstream pressure of 20 kPa and spraying conditions. This demonstrates the ability to use the dual chamber design with a gas selected to improve overall operating performance.

What is claimed is:

1. A charge injection device of the kind having discharge means, including an orifice, for issuing free-charge injected fluid, and a first region of lower pressure downstream of said discharge means, said charge injection device comprising means arranged to raise the pressure in a second region immediately downstream of said orifice to above said downstream pressure such that fluid issuing from said discharge means passes through said second region before entering said first region.

2. A charge injection device of the kind having discharge means, including an orifice, for issuing free-charge injected fluid, and a first region of lower pressure downstream of said discharge means, said charge injection device comprising a chamber into which said discharge means issues through said orifice which is arranged as an entrance orifice to said chamber for charged fluid, said chamber having an inlet for introducing a gas feed to increase the pressure in said chamber and an outlet orifice for issuing the charged fluid into said downstream region.

3. A charge injection device according to claim 2, further comprising gas supply means, including pressure adjusting means, connected to said gas inlet for enabling the pressue at the discharge means to be controlled at a value different from the pressure in said downstream region.

4. A charge injection device according to claim 3, wherein the gas supply means is arranged to supply a gas to said chamber for opposing dielectric breakdown in the region of said chamber.

5. A charge injection device according to claim 4, wherein the said gas comprises sulfur hexafluoride.

6. A charge injection device according to claim 3, wherein said gas comprises air.

7. A charge injection device according to claim 2, wherein said entrance orifice is smaller in size than said outlet orifice.

8. A charge injection device according to claim 7, wherein the ratio of the sizes of said entrance orifices and said outlet orifice is about 1:3.

9. A charge injection device according to claim 7, wherein the entrance orifice and outlet orifice are both circular.

10. A charge injection device according to claim 9, wherein the entrance orifice has a diameter of about 0.05 cm and the outlet orifice has a diameter of about 0.15 cm.

11. A charge injection device according to claim 7, wherein said entrance orifice is formed in a low voltage electrode in one end of a further chamber having a fluid inlet port, there being a high voltage electrode in said further chamber having a pointed region in the vicinity of said entrance orifice so that the two electrodes enable free charge to be injected into said fluid, there being also a ground electrode for completing the electrical circuit for the free charge.

12. A charge injection device according to claim 2, wherein the size of the outlet orifice is selected to provide for choked fluid flow through that orifice.

13. Apparatus for use in clarifying a contaminated fluid in which the contaminant forms a dispersion in the fluid, the apparatus comprising a separation vessel and a charge injection device according to claim 1, arranged to inject free excess charge that is net unipolar into the contaminated fluid and to issue it through a gas or vapor space and into the separation vessel so that the injected charge both induces an electric field in the fluid in the separation vessel and causes the dispersion to become charged, whereby the electric field and charged dispersion interact to cause migration of the dispersion towards the separation vessel wall surfaces and collection on collector surfaces in the path of the migrating dispersion.

14. Apparatus according to claim 13, wherein the collector surfaces are inside surface areas of the separation vessel walls.

15. Apparatus according to claim 13, wherein the collector surfaces are the exposed surfaces of a bed of closely-packed beads contained inside the separation vessel.

16. Apparatus according to claim 15, wherein the beads are made of dielectric material.

17. Apparatus according to claim 15, wherein the beads are glass beads.

18. Apparatus according to claim 15, wherein the beads are made ef porous material.

19. Apparatus according to claim 15, wherein the charge injection device further comprises gas supply means, including pressure adjusting means connected to said gas inlet for enabling the pressure at the discharge means to be controlled independently of the pressure in said gas space.

20. Apparatus according to claim 19, wherein the entrance orifice is smaller in size than said outlet orifice and both orifices are circular.

21. Apparatus according to claim 20, wherein the ratio of the sizes of said orifices is about 1:3.

* * * * *